March 25, 1941.                G. WHITE                    2,235,969
APPARATUS FOR THE MANUFACTURE OF BENT TEMPERED SHEETS OF GLASS
             Filed Dec. 23, 1937           2 Sheets-Sheet 1
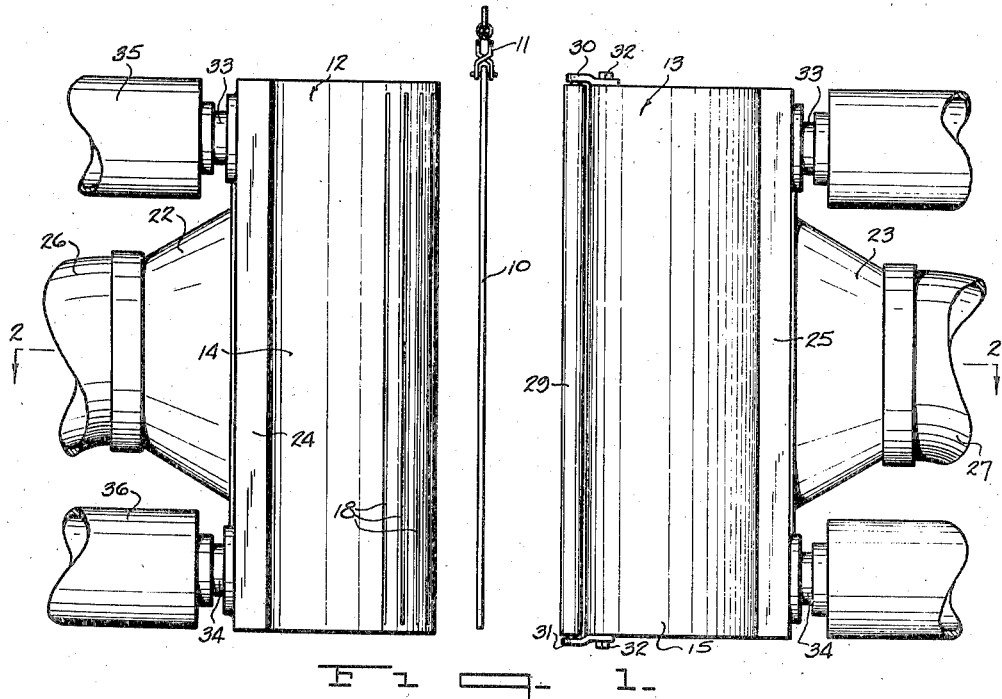
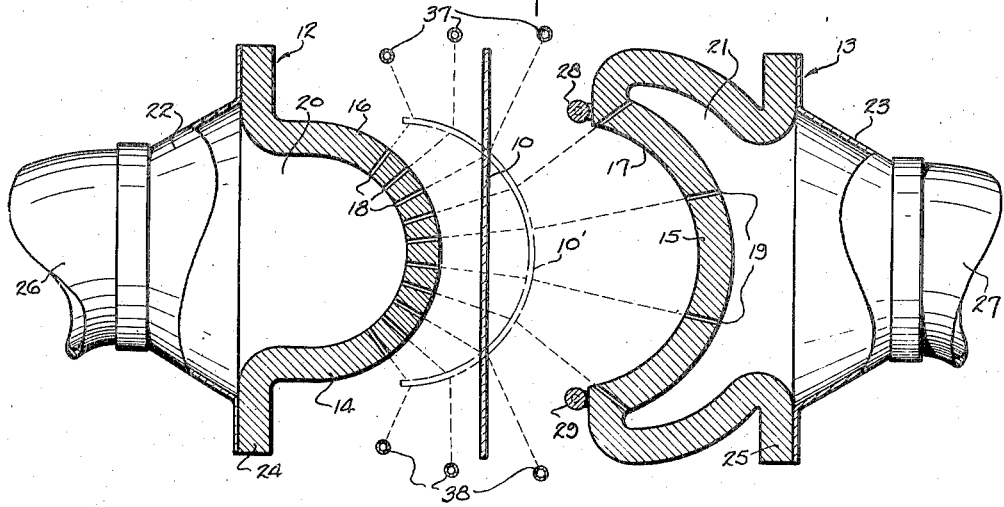
Inventor
GERALD WHITE.
By Frank Fraser
Attorney March 25, 1941.  G. WHITE  2,235,969
APPARATUS FOR THE MANUFACTURE OF BENT TEMPERED SHEETS OF GLASS
Filed Dec. 23, 1937  2 Sheets-Sheet 2

Inventor
GERALD WHITE.
By Frank Fraser
Attorney

Patented Mar. 25, 1941

2,235,969

UNITED STATES PATENT OFFICE 2,235,969

APPARATUS FOR THE MANUFACTURE OF BENT TEMPERED SHEETS OF GLASS

Gerald White, Toledo, Ohio, assignor to Libbey-Owens-Ford Glass Company, Toledo, Ohio, a corporation of Ohio Application December 28, 1937, Serial No. 182,148

4 Claims. (Cl. 49—45)

The present invention relates to improved apparatus for the manufacture of bent, tempered sheets of glass of predetermined curvature.

In the practice of one well known process of tempering flat sheets of glass, the sheet is first heated to approximately the point of softening of the glass and then suddenly chilled to place the outer surfaces of said sheet under compression and the interior thereof under tension. The glass sheet is heated to the proper temperature in a suitable furnace, and upon removal therefrom is subjected immediately to the action of suitable cooling means by which the glass is suddenly chilled. The cooling means usually employed comprises spaced blower heads between which the highly heated glass sheet is received, said blower heads being provided with a plurality of outlets which serve to direct jets or blasts of cooling air upon opposite surfaces of the sheet simultaneously. Ordinarily, the sheet is maintained in a vertical position during treatment thereof, and it is customary to suspend the said sheet from a plurality of relatively small hooks or tongs engaging the same near its upper edge. The advantages of this type of glass over ordinary sheet or plate glass are well known in the art and need not be enumerated herein.

Broadly, it is the aim of this invention to produce curved or bent sheets of tempered glass by the general process described above of first heating the sheet to approximately the point of softening of the glass and then suddenly chilling the same. More specifically, a flat sheet of glass to be bent and tempered is first suspended in a vertical position and heated in a suitable furnace to a temperature approximating the softening point of the glass. When properly heated, the glass sheet is transferred from the furnace to a position between opposed bending elements which are then moved into engagement with the two faces of the heated sheet to effect the bending thereof to the desired curvature. The bending elements are then removed from engagement with the glass and the curved sheet subjected to a sudden cooling action to temper the same while still vertically suspended and while maintained in the same position in which it was bent.

An important object of the invention is to provide apparatus whereby bent, tempered sheets of glass can be produced in a thoroughly practical and efficient manner with less liability of breakage of the glass and a reduced tendency toward warping or distortion of the glass surfaces.

Another important object of the invention is to provide such apparatus whereby flat sheets of glass, while vertically suspended, can be first heated and bent to an accurate, predetermined curvature and then suddenly cooled to temper the same without changing or shifting the position of the sheets between the bending and cooling operations, thereby reducing the amount of handling of the glass and the chances of injury thereto to a minimum.

Other objects and advantages of the invention will become more apparent during the course of the following description, when taken in connection with the accompanying drawings.

In the drawings, wherein like numerals are employed to designate like parts throughout the same:

Fig. 1 is an elevation of apparatus constructed in accordance with the invention for effecting the bending and subsequent cooling of the glass sheets;

Fig. 2 is a horizontal section taken substantially on line 2—2 of Fig. 1; and

Figures 3, 4:
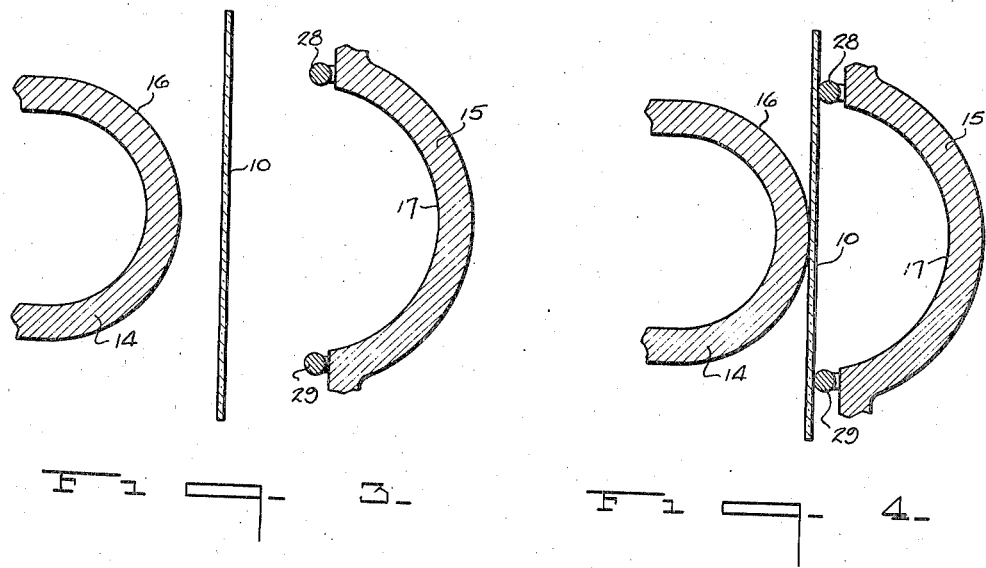
Figs. 3, 4, 5 and 6 are diagrammatic views illustrating different stages in the bending of the glass sheets.

With reference to the drawings, and particularly to Figs. 1 and 2, the numeral 10 designates a flat sheet of glass which is to be bent and tempered, said sheet being suspended vertically from a plurality of relatively small hooks or tongs 11 engaging the same near its upper edge. Arranged at opposite sides of the glass sheet 10 are the combined bending and cooling elements 12 and 13 operable to effect first the bending of the sheet to the desired curvature and then the sudden cooling thereof to temper the same. The glass sheet 10 is adapted to be brought to a temperature approximating the point of softening of the glass in any desired manner, such as by heating the same in a suitable furnace, and after the said sheet has been properly heated, it is preferably brought into position between the bending and cooling elements 12 and 13 with the least possible loss of heat and exposure to the atmosphere.

The combined bending and cooling elements 12 and 13 consist of vertically elongated blower heads 14 and 15 constituting male and female mold members having complemental convex and concave bending surfaces 16 and 17 respectively, the curvature of which corresponds to the curvature to be given the opposite faces of the glass sheet 10. The blower heads 14 and 15 are provided with a plurality of transversely spaced, vertically extending outlets 18 and 19 respectively facing in the direction of the glass sheet and passing through the convex and concave bending surfaces 16 and 17. The outlets 18 and 19 may consist either of longitudinally extending slots, as shown, or of a plurality of relatively small openings arranged longitudinally of the blower heads. The blower heads 14 and 15 are chambered in back of the outlets 18 and 19 as at 20 and 21 respectively, with the said chambers 20 and 21 being closed by casings 22 and 23 secured to the flanges 24 and 25 of blower heads 14 and 15 respectively and connected to suitable blowing apparatus (not shown) by conduits 26 and 27 so that jets or blasts of cooling air may be discharged through the outlets 18 and 19 against opposite surfaces of the glass sheet simultaneously.

To aid in the bending of the glass sheet 10, the blower head 15 is provided adjacent opposite sides thereof outwardly of concave bending surface 17 with the auxiliary bending elements 28 and 29 preferably consisting of vertically arranged idler rollers journaled at their upper and lower ends in bracket arms 30 and 31 fixed to said blower head by screws or the like 32.

Each blower head 14 and 15 may be carried adjacent its upper and lower ends by horizontal pistons 33 and 34 operating in cylinders 35 and 36 respectively so that the blower heads are adapted to be moved toward and away from one another by parallel movement. Any suitable mechanism can of course be provided for controlling the desired movement of the blower heads.

Figures 5, 6:
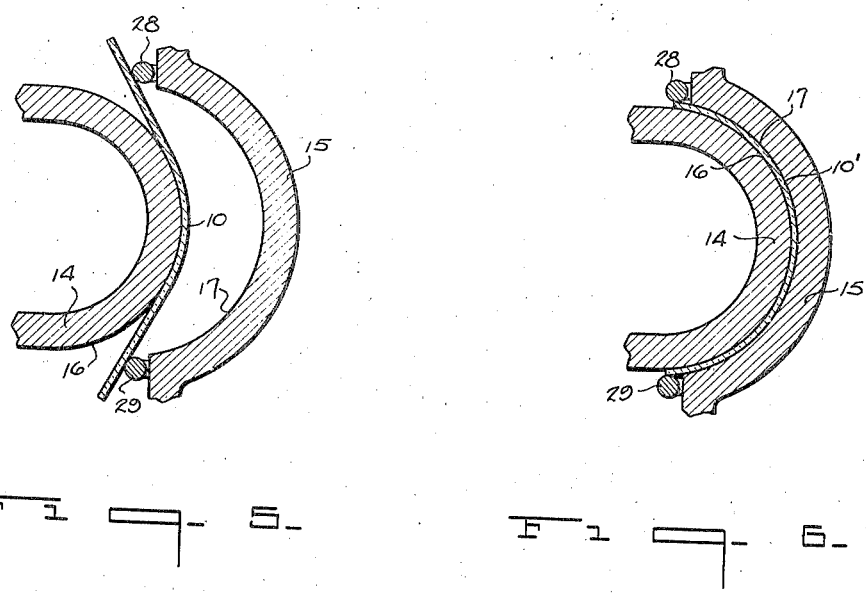

In carrying out the invention, the flat sheet of glass 10 to be bent and tempered is first heated to a temperature approximating the softening point of the glass and then brought into position between the blower heads 14 and 15, as shown in Figures 1, 2, and 3. The blower heads are then moved simultaneously toward one another until, as illustrated in Figure 4, the convex bending surface 16 of blower head 14 engages one face of the glass sheet 10 at a point intermediate the opposite vertical side edges thereof, while simultaneously, the auxiliary bending elements 28 and 29 carried by blower head 15 will engage the opposite face of the glass sheet adjacent the vertical side edges thereof. Upon continued movement of the blower heads toward one another, the glass sheet will be wrapped about the convex bending surface 16 of blower head 14 as shown in Fig. 5. This movement of the blower heads is continued until, as disclosed in Fig. 6, the concave bending surface 17 of blower head 15 also engages the glass sheet and cooperates with the convex bending surface 16 of blower head 14 to press the said sheet therebetween to an accurate predetermined curvature. The completely bent sheet is indicated at 10' and is shown in broken lines in Fig. 2 and in full lines in Fig. 6.

After the glass sheet has been properly bent, the blower heads 14 and 15 are simultaneously moved away from one another out of engagement with the sheet and back to their original position, while the curved sheet 10' remains suspended between said blower heads as disclosed in Fig. 2. The blowing apparatus (not shown) is then operated to cause jets or blasts of cooling air to be discharged from the outlets 18 and 19 of the blower heads against opposite surfaces of the curved sheet of glass 10' to temper the same.

It will be noted, upon reference to Fig. 2, that the blower head 14 is provided with a relatively larger number of outlets than blower head 15 and therefore, in order to effect the uniform cooling of opposite surfaces of the bent sheet, a plurality of additional cooling elements 37 and 38, preferably in the form of slotted or perforated pipes, are arranged at opposite sides of the sheet, which pipes cooperate with the blower head 15 to effect the cooling of the convex surface of the bent sheet of glass in an amount equal to the cooling of the concave surface of the sheet by the blower head 14.

It will be readily apparent that since the glass sheet is suspended from the tongs or hooks 11 and maintained in the same position during the bending and cooling operations, the liability of the glass surface becoming warped or distorted during treatment is greatly lessened. Also, danger of breakage of the glass or other injury thereto is greatly diminished by making it unnecessary to change or shift the position of the highly heated sheet between the bending and cooling operations. The heating of the glass sheet preparatory to the bending thereof likewise effects the heating of the glass to the desired temperature for tempering, so that only a single heating operation is necessary.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. Apparatus for bending and tempering a sheet of glass, supported in a vertical position and heated to a temperature approximating the softening point of the glass, comprising blower heads positioned at opposite sides of said sheet and constituting male and female mold members having convex and concave bending surfaces respectively adapted to engage opposite surfaces of the heated sheet and between which said sheet is bent to the desired curvature, means for mounting said mold members for movement toward and away from one another, auxiliary bending elements carried by said female mold member at opposite sides and outwardly of the concave bending surface thereof and acting to wrap the glass sheet about said male mold member upon movement of the said mold members toward one another and before the glass sheet is pressed between the convex and concave bending surfaces, and outlets formed in said mold members for directing jets or blasts of cooling air upon opposite surfaces of the sheet subsequent to the bending thereof and after the mold members have been moved away from and out of engagement with said sheet.

2. Apparatus for bending and tempering a sheet of glass, supported in a vertical position and heated to a temperature approximating the softening point of the glass, comprising vertically elongated blower heads positioned at opposite sides of said sheet and constituting male and female mold members having transversely convex and concave bending surfaces respectively adapted to engage opposite surfaces of the heated sheet and between which said sheet is bent to the desired curvature, means for mounting said mold members for movement toward and away from one another, auxiliary bending elements comprising vertically arranged idler rollers carried by said female mold member at opposite sides and outwardly of the concave bending surface thereof and acting to wrap the glass sheet about said male mold member upon movement of the said mold members toward one another and before the glass sheet is pressed between the convex and concave bending surfaces, and outlets formed in said mold members for directing jets or blasts of cooling air upon opposite surfaces of the sheet subsequent to the bending thereof and after the mold members have been moved away from and out of engagement with said sheet.

3. Apparatus for bending and tempering a sheet of glass, supported in a vertical position and heated to a temperature approximating the softening point of the glass, comprising blower heads positioned at opposite sides of said sheet and constituting male and female mold members having convex and concave bending surfaces respectively adapted to engage opposite surfaces of the heated sheet and between which said sheet is bent to the desired curvature, means for mounting said mold members for movement toward and away from one another, auxiliary bending elements carried by said female mold member at opposite sides and outwardly of the concave bending surface thereof and acting to wrap the glass sheet about said male mold member upon movement of the said mold members toward one another and before the glass sheet is pressed between the convex and concave bending surfaces, outlets formed in said mold members for directing jets or blasts of cooling air upon opposite surfaces of the sheet subsequent to the bending thereof and after the mold members have been moved away from and out of engagement with said sheet, and additional cooling means arranged outwardly of the opposite edges of the sheet and cooperating with the female mold member to effect the cooling of the convex surface of the bent sheet of glass in an amount equal to the cooling of the concave surface of the sheet by the male mold member.

4. Apparatus for bending and tempering a sheet of glass, supported in a vertical position and heated to a temperature approximating the softening point of the glass, comprising vertically elongated blower heads positioned at opposite sides of said sheet and constituting male and female mold members having transversely convex and concave bending surfaces respectively adapted to engage opposite surfaces of the heated sheet and between which said sheet is bent to the desired curvature, means for mounting said mold members for movement toward and away from one another, auxiliary bending elements comprising vertically arranged idler rollers carried by said female mold member at opposite sides and outwardly of the concave bending surface thereof and acting to wrap the glass sheet face about said male mold member upon movement of the said mold members toward one another and before the glass sheet is pressed between the convex and concave bending surfaces, outlets formed in said mold members for directing jets or blasts of cooling air upon opposite surfaces of the sheet subsequent to the bending faces thereof and after the mold members have been moved away from and out of engagement with said sheet, and additional vertically disposed cooling elements arranged outwardly of the opposite edges of the sheet and cooperating with the female mold member to effect the cooling of the convex surface of the bent sheet of glass is an amount equal to the cooling of the concave surface of the sheet by the male mold member.

GERALD WHITE.